Feb. 10, 1942.　　　W. A. SERIGHT　　　2,272,436
VINE CUTTER
Filed April 28, 1941　　　2 Sheets-Sheet 1

W. A. SERIGHT INVENTOR.
BY Merrill M. Blackburn
ATTORNEY.

Feb. 10, 1942.          W. A. SERIGHT          2,272,436
                          VINE CUTTER
              Filed April 28, 1941        2 Sheets-Sheet 2
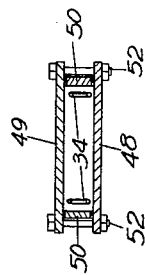
FIG. 5
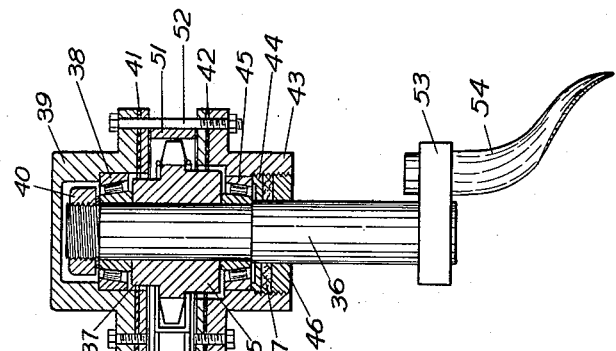
FIG. 4
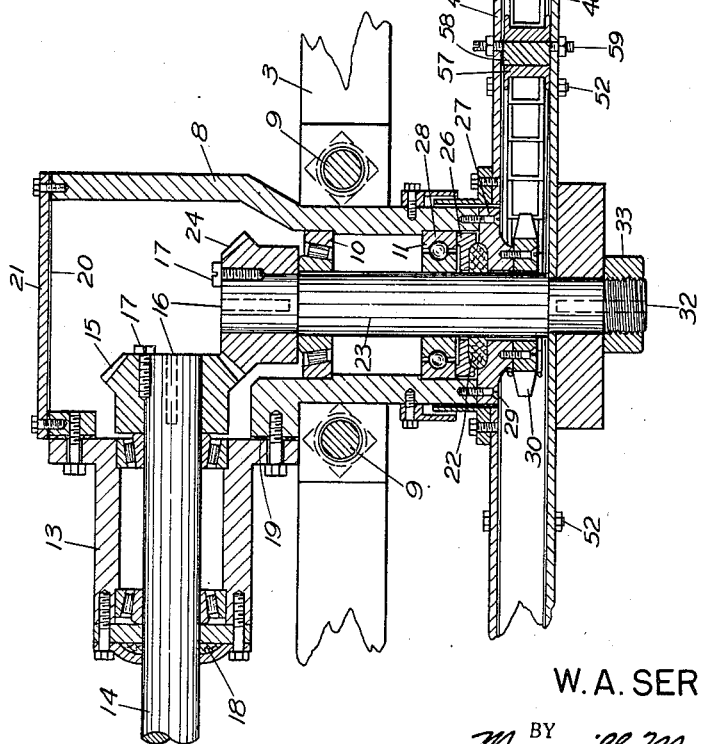
W. A. SERIGHT    INVENTOR.
BY
Merrill M. Blackburn.
                    ATTORNEY.

Patented Feb. 10, 1942

2,272,436

UNITED STATES PATENT OFFICE 2,272,436

VINE CUTTER

Warren A. Seright, Muscatine, Iowa

Application April 28, 1941, Serial No. 390,798

7 Claims. (Cl. 56—26.5)

My present invention relates to agricultural implements and more particularly to that class of such implements as are utilized for the cutting of vines, the machine being developed particularly for the cutting of sweet potato vines, though it may be used for other similar purposes.

In the harvesting of vining crops, particularly such as sweet potatoes, considerable difficulty has been experienced, unless some means were found for removing the vines prior to the harvesting operation. Various attempts have been made along this line but unsuccessfully, it is believed, prior to the present invention which is highly successful in the fields.

Among the objects of this invention are to provide a mechanism for the purpose indicated which will sever the vines of vining crops at or close to the surface of the ground, either just above or just below the same; to provide a structure for the purpose indicated which will not be unduly expensive to manufacture and which can therefore be sold at a price within the reach of producers of this kind of crops; to provide a machine for the purpose indicated which will require a minimum of care and yet will maintain its efficiency of operation; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense, since various modifications may be made within the scope of the appended claims without departing from the spirit of this invention.

In the drawings annexed hereto and forming a part hereof,

Fig. 4 represents a fragmentary longitudinal vertical section taken substantially along the plane indicated by the line 4—4, Fig. 2; and Fig. 5 represents a transverse section through the cutting unit substantially along the plane indicated by the line 5—5, Fig. 4.

Figure 1:
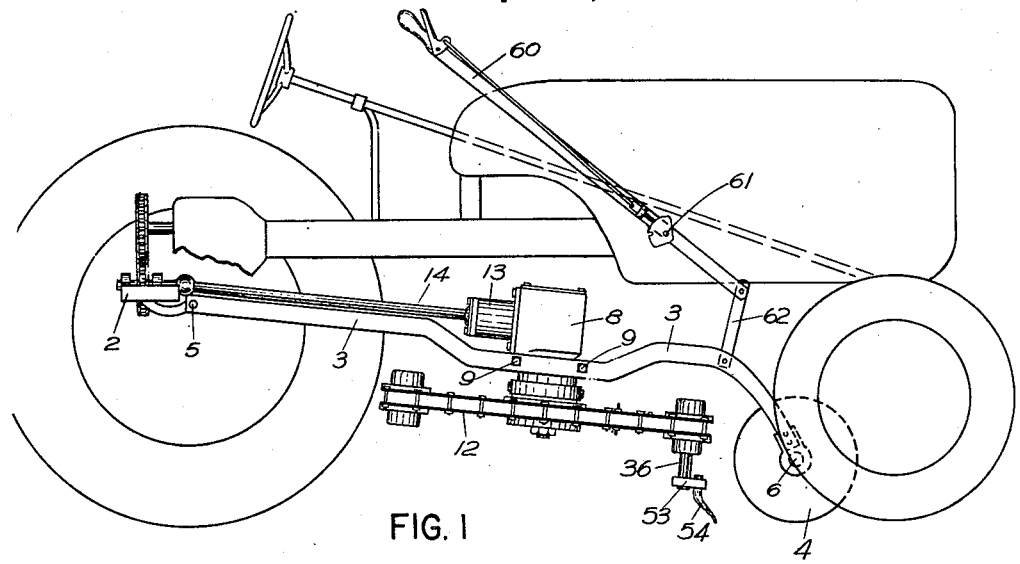
Fig. 1 shows a right side elevation of my invention, attached to a tractor, the latter being illustrated in broken lines.
Figure 2:
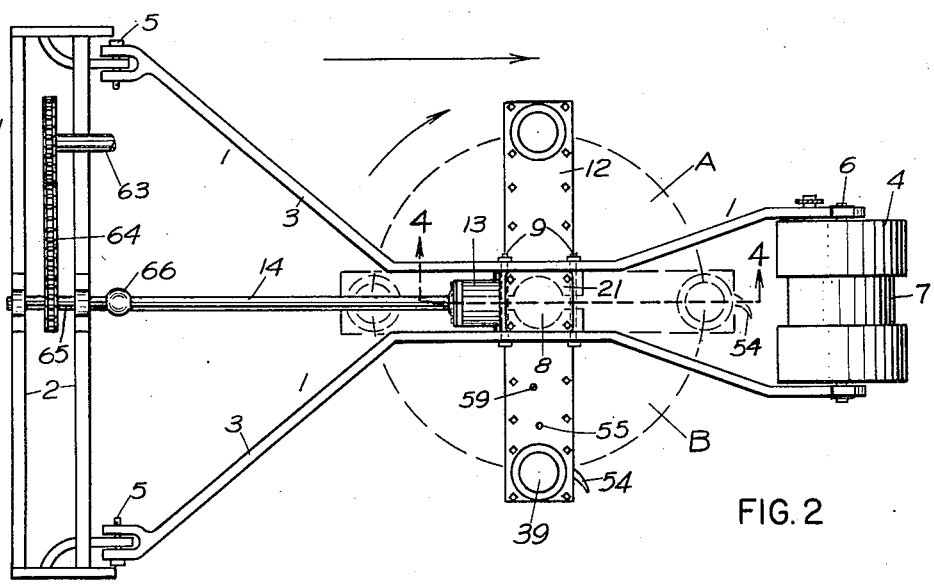
Fig. 2 represents a plan view of this construction shown detached from the tractor.

Reference will now be made in greater detail to the annexed drawings for a more complete disclosure of this invention. As shown in Fig. 1, this structure is intended to be operated with a tractor, and comprises a supporting frame and a cutting unit, rotating about an axis which is fixed with relation to the supporting frame, one end of which is supported by the tractor and the other end by a roller or its equivalent. The unit frame is denoted by the numeral 1 and comprises a cross-frame 2 supported in connection with the rear axle of the tractor, side frame members 3, and a roller or equivalent supporting means 4. As clearly shown in Fig. 2, the frame members 3 are pivotally connected at 5 to the cross-frame 2 and at 6 to the roller 4 or its equivalent. Such an equivalent would be a pair of small wheels held in spaced relationship to provide a recessed portion 7 which is normally to follow the row of sweet potatoes or other vining crop.

Located between the frame members 3 is a box-like member or gear casing 8 which is held in position between the members 3 by means of bolts 9 extending transversely through openings in the members 3. This box-like member 8 serves as a support for bearings 10 and 11 and the rotating crossarm 12. This member 8 also serves as a support for the bearing housing 13 through which the drive shaft 14 passes. On the inner end of the shaft 14 is mounted a gear 15 which is secured to the shaft by means of a key 16 and a bolt 17. A packing gland, including an oil seal 18, surrounds the shaft 14 and is secured to the end of the housing 13, as shown. Gaskets 19 and 20 serve as oil seals between the housing 8 and the housing 13 and cover 21. The purpose is to have all of the outside joints so tight that there will never be enough leakage of oil from the housing 8 to make it necessary to replenish the charge of oil initially placed in this housing. To this end, an oil seal 22 surrounds the shaft 23 and prevents downward leakage of the oil from the housing 8 along the shaft 23.

On the upper end of the shaft 23 is a bevel gear 24 meshing with the gear 15 and secured to the shaft by means of the key 16 and the bolt 17. As is common practice, roller bearings are used to reduce to a minimum the friction of the rotating shafts 14 and 23. The oil seal 22 is forced upwardly against the washer 26 by a plate 27, and this forces the bearing ring 28 against the shoulder of the housing 8, as clearly shown in Fig. 4. Screws 29 draw the plate 27 against the end of the housing 8. A sprocket 30 is attached to the plate 27 and it will therefore be obvious that the sprocket 30 is normally not movable with relation to the frame members 3, since it is secured to the plate 27 which is, in turn, secured to the housing 8, and this to the bars 3.

Secured to the lower end of the shaft 23 by a key 32 and nut 33 is the hollow crossarm 12 which contains the sprocket 30 and the chain 34. At its outer end, this box-like member or crossarm contains a sprocket 35 which is connected in driving relation to the reduced portion of the shaft 36. At its upper end, the sprocket 35 has a hub 37 which extends through an opening in the removable top of the crossarm 12. The inner ring of a roller bearing 38 surrounds the shaft 36 and rests against the end of the hub 37 of the sprocket 35. The outer ring of this bearing 38 fits closely within a cap 39 which covers the end of the shaft and the nut 40 secured thereto. Between the cap 39 and the top of the crossarm 12 is a gasket 41 which prevents leakage of oil between these parts. A similar gasket 42 is located between the bottom of member 12 and the bearing support 43 surrounding the shaft 36 where it projects from member 12. An externally threaded washer 44 is secured against the lower face of the outer ring 45 of a roller bearing and tends to hold this ring in upwardly adjusted position. An externally threaded nut 46 is screwed inwardly against a seal 47 which presses upwardly against the washer 44, locking it in position. The bottom 48 and top 49 of the member 12 are held spaced a proper distance apart by the members 50 and 51 and are drawn together by bolts 52.

Mounted on the lower end of the shaft 36 is a crossbar 53 which has a cutter-head 54 mounted therein, this cutter-head being reduced and flattened toward its free end and having its forward edge sharpened to cut the vines as it strikes them when the cross-member 12 rotates about the axis of the shaft 23. Normally the box-like member or crossarm 12 is filled with oil when assembled, and there is very little if any chance for leakage thereof. However, lest there be some inadvertently, a screw-threaded opening in formed in the top 49, and this is closed by a plug 55 which may be removed for the addition of oil, if this should prove to be necessary.

Figure 3:
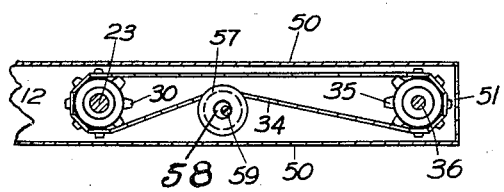
Fig. 3 represents a fragmentary horizontal section through the cutting unit, the section being taken just below the cover element of this unit.

Since a certain amount of wear and so-called stretch of the chain 34 seems practically inevitable, means is provided for tightening this chain. This is shown in Fig. 3 where there is illustrated a pulley 57 pivotally mounted upon a cylindrical member 58 from the ends of which screw-threaded extensions 59 project eccentrically. The member 58 fits fairly closely between the plates 48 and 49 and extends slightly beyond the pulley or spool 57 so that the latter can be allowed to rotate about the former when the nuts are tightened up on the extensions 59 to cause gripping of the member 58 between the plates 48 and 49. By rotating the member 58 about the axis of the extensions 59, the tension of the chain 34 can be adjusted so that there will be just the right amount of tension to keep the chain running smoothly.

From the foregoing it will be seen that, since the sprocket 30 is fixed with relation to the housing 8 and the chain 34 is carried around this sprocket as the sprocket 35 revolves about the sprocket 30, the two motions of revolution of the sprocket 35 about the axis of the shaft 23 and backward rotation of the sprocket 35 neutralize each other, causing the cutter element 54 always to point in the same direction. In other words, wether the arm 12 is in the solid-line position or in the position shown by the broken lines in Fig. 2, the member 54 will always point forwardly. Experience has shown that if the member 54 crosses the row of vines too slowly, it will not cut them but will pull and, perhaps, break the vines. On the other hand, if the member 54 revolves rapidly about the shaft 23, it will strike the vines a sharp blow, tending to cut them off, instead of breaking them by pulling. Hence, less force is required to cut the vines if the arm 12 is rotating sufficiently rapidly. It has been found best to run the cutter unit at not less than 500 R. P. M.

As is clear from Fig. 1, a handle 60, reaching from near the operator's seat and pivoted at 61, extends forwardly and is pivotally connected to a link 62 which, at its other end, is connected to one or both of the frame members 3 and serves as means for lifting the forward end of the frame 1 and raising the cutting unit 54 away from the ground for transportation from one field to another or from a farmyard to a place of use, or vice versa. A suitable clutch, not shown, is provided in the drive train so that operation of the crossarm 12 may be discontinued when the cutter is not in use. If the tractor motor is mounted at one side of the machine, then the power take-off shaft 63 may extend directly rearwardly and the power be transmitted by means of the chain 64 to the drive shaft 14. On the other hand, if the tractor motor is mounted centrally of the machine, the frame members 3 should be bent so that the bearing support 13 will point rearwardly and toward one side of the machine to connect with the stub-shaft 65 constituting one section of the drive shaft 14. In such an arrangement, the universal 66 connecting the two sections of the drive shaft arranged at an angle to each other will function in the usual manner of universal connections. Whether the second universal, near the bearing support 13, is necessary or not will depend upon whether the long section of the drive shaft and the axis of the support 13 are in alignment. This is an obvious modification of the structure shown in Fig. 2 and depends, as indicated, on the location of the tractor motor. The normal cutting range of the machine lies between the lines indicated by the letters A and B.

Briefly, the operation of the machine is as follows: With the tractor motor running, the machine is run along a row of vegetable matter having vines on or near the surface of the earth which are to be cut, the row being kept in the depressed portion 7 of the forward support 4. When a position is reached at the beginning of a row, the clutch which places the cutter crossarm into motion is engaged, and the lever 60 is raised to permit the lowering of the front end of the vine cutter so that the support 4 will rest on the ground. Now, as the machine is propelled along the row, the support 4 follows the contour of the ground so that the cutter element 54 will approximately contact the surface of the ground, although it may sometimes be slightly above or slightly below the surface. Now, as the machine is propelled through the field, the crossarm 12 revolves about the axis of the shaft 23 and the cutter element 54 engages and cuts substantially all of the vines in a row.

While I have herein disclosed what is now regarded as the preferred embodiment of this invention, it will be understood that the specific description may be departed from without departing from the spirit of this invention as set forth in the appended claims.

Having now described my invention, I claim:

1. A vine-cutting attachment for a tractor comprising a frame pivotally connected to the tractor and having at its forward end rolling means to roll on the ground and support the frame adjustably with relation to the ground, a crossarm horizontally rotatably carried beneath said frame and having a vine-cutting tool connected thereto and extending downwardly therefrom into a position to engage vines on or near the surface of the ground and sever them from the parts thereof within the ground, and power means to rotate said crossarm about its axis of rotation.

2. A vine-cutter comprising, in combination, a motor vehicle having a power take-off and a frame, a frame connected to the frame of the vehicle and having a part thereof pivotally movable up and down, a gear housing connected to the last mentioned frame and having a rotatable crossarm carried thereby and located below the frames, a vine-cutting unit adjacent one end of the crossarm and revolving about the longitudinal axis of the housing, shafts extending into and out of said housing at a substantial angle to each other, drive means operatively interconnecting said shafts, said crossarm being operatively connected to the lower end of the shaft extending out of said gear housing, and drive means synchronizing the operation of the vine-cutting tool and the driven shaft so that said tool will aways project in the same direction relatively to the course of travel of the tractor.

3. A vine-cutter comprising, in combination, a frame adapted to be pivotally connected to the frame of a motor vehicle, said frame having at its free end a ground-contacting supporting means, a gear casing normally immovably attached to and supported by said pivotally connected frame intermediate its ends, a shaft within said frame and extending downwardly therefrom, an arm attached to said shaft and rotatable therewith, a shaft in one end of said arm and extending transversely thereto, and a vine-cutting tool on the lower end of said shaft and extending into a position to engage vines on or adjacent the ground surface below said arm.

4. A structure for the purpose indicated comprising, in combination, a frame supported at one end by a rolling ground-contacting unit at its other end by a vehicle frame, a pair of shafts rotatably carried by said frame and arranged at a substantial angle to each other, one of said shafts being a driving shaft and the other a driven shaft, and the two being connected in driving relation, said driven shaft having one end extending downwardly below said frame, an arm rigidly secured to the downwardly extending end of said driven shaft, a shaft extending into an end portion of said arm, transversely thereof, and rotatably mounted with reference thereto, and a vine-cutting tool attached to the projecting end of said last mentioned shaft.

5. In a structure for the purpose indicated, in combination, operatively connected driving and driven shaft, a framework for the support thereof, said driven shaft extending downwardly through said framework and being rotatable therein, an arm fixedly carried by the lower end portion of said driven shaft and extending laterally therefrom, a sprocket within said arm and surrounding said driven shaft, said sprocket being fixedly mounted with relation to said frame, a second sprocket in an end portion of said arm and connected in driving relation to the first sprocket, said sprockets being of such a size relatively to each other that, as the second sprocket revolves about the first sprocket, the means connecting the sprockets causes the second sprocket to rotate about its axis once for each time it revolves about the driven shaft so that said second sprocket always keeps the same tooth forward, and a vine-cutting implement carried by the second sprocket and revolving with it about the driven shaft.

6. In a structure for the purpose indicated, a supporting framework, means for raising and lowering the framework with relation to the ground, a driven shaft rotatably mounted with relation to said framework and extending transversely thereof, a sprocket rigidly connected with said framework and surrounding said shaft so that the shaft is rotatable within the sprocket, an arm extending transversely of the shaft and having said sprocket within itself, said arm rotating with said driven shaft, a second sprocket within said arm and relatively rotatable with reference to the arm, a chain connecting said sprockets so that the sprockets do not rotate with relation to each other as the second sprocket revolves about the first sprocket, a shaft extending through the second sprocket and rigidly connected thereto, and a vine-cutting implement connected to said shaft and projecting downwardly into close proximity to the earth's surface when the machine is operating and the implement is in vine-cutting position.

7. A vine cutter for use in connection with a motor propelled vehicle comprising a frame to be pivotally connected to the frame of a vehicle, a lever to be pivotally mounted on the vehicle frame, a link connecting the lever with the frame of the vine cutter, said lever serving to hold the vine cutter from the ground when transporting the machine, a driven shaft extending transversely of the vine cutter frame and in a generally vertical direction, an arm on the lower portion of said driven shaft and extending transversely thereto, driving connections from the motor to the driven shaft to cause rotation thereof, a shaft extending through an end portion of said arm substantially parallel to said driven shaft and having a sprocket thereon within the arm, a vine-cutting tool connected with the lower end of the last mentioned shaft, a chain operatively connecting the sprockets, and tightening means for adjusting the tension of the chain.

WARREN A. SERIGHT.